(12) United States Patent
Christ et al.

(10) Patent No.: US 9,448,082 B2
(45) Date of Patent: Sep. 20, 2016

(54) METHOD FOR OPERATING A HYBRID DRIVE

(71) Applicant: Bayerische Motoren Werke Aktiengesellschaft, Munich (DE)

(72) Inventors: Thomas Christ, Munich (DE); Moritz Gretzschel, Graefelfing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/054,995

(22) Filed: Oct. 16, 2013

(65) Prior Publication Data

US 2014/0046592 A1   Feb. 13, 2014

Related U.S. Application Data

(63) Continuation of application No. PCT/EP2012/056731, filed on Apr. 13, 2012.

(30) Foreign Application Priority Data

May 4, 2011 (DE) .................. 10 2011 075 226

(51) Int. Cl.
*B60W 10/06* (2006.01)
*G01C 21/34* (2006.01)
(Continued)

(52) U.S. Cl.
CPC .......... *G01C 21/3469* (2013.01); *B60W 10/06* (2013.01); *B60W 10/08* (2013.01); *B60W 20/00* (2013.01); *B60W 50/0097* (2013.01); *B60W 2550/402* (2013.01); *Y02T 10/52* (2013.01); *Y02T 10/56* (2013.01); *Y02T 10/6269* (2013.01); *Y02T 10/6291* (2013.01); *Y02T 10/84* (2013.01)

(58) Field of Classification Search
None
See application file for complete search history.

(56) References Cited

U.S. PATENT DOCUMENTS 8,527,122 B2 *   9/2013   Yamada et al. .................. 701/22
8,615,342 B2 *  12/2013   Suganuma et al. ............. 701/22
(Continued)

FOREIGN PATENT DOCUMENTS

| CN | 101801750 A | 8/2010 |
| DE | 10 2006 033 930 A1 | 1/2008 |

(Continued)

OTHER PUBLICATIONS

German Office Action with English translation dated Dec. 7, 2011 (nine (9) pages).

(Continued)

*Primary Examiner* — John R Olszewski
*Assistant Examiner* — James M McPherson
(74) *Attorney, Agent, or Firm* — Crowell & Moring LLP

(57) ABSTRACT

A method operates a hybrid drive operable selectively in a first operating mode powered by only an internal combustion engine or in a second operating mode powered by only an electric motor. Prior to starting a trip, for which a route that leads from a start to a destination is determined, the entire route to be traveled is segmented, according to pre-defined logic, into a plurality of route sections. These route sections are used to select certain route sections that are ever taken into consideration, based on certain route section criteria, for driving in the second mode. From, the selected certain route sections, those are used to identify and to drive on the route in the second mode in which route travel in the second mode yields a total maximum fuel economy advantage compared to driving the route in the first or any other mode.

19 Claims, 2 Drawing Sheets

(51) Int. Cl.
*B60W 10/08* (2006.01)
*B60W 20/00* (2016.01)
*B60W 50/00* (2006.01)

(56) References Cited

U.S. PATENT DOCUMENTS

| | | |
|---|---|---|
| 2003/0009269 A1* | 1/2003 | Graf et al. ............... 701/22 |
| 2006/0278449 A1* | 12/2006 | Torre-Bueno ............ 180/65.2 |
| 2007/0010933 A1* | 1/2007 | Hochkirchen et al. ..... 701/117 |
| 2009/0259355 A1* | 10/2009 | Li ............................ 701/22 |
| 2010/0197451 A1 | 8/2010 | Kaltenbach et al. |
| 2010/0286909 A1* | 11/2010 | Tate et al. ............... 701/209 |
| 2011/0029168 A1* | 2/2011 | Talberg .................... 701/22 |
| 2011/0160946 A1* | 6/2011 | Wilde et al. .............. 701/22 |
| 2011/0246004 A1* | 10/2011 | Mineta ..................... 701/22 |
| 2012/0173075 A1* | 7/2012 | Mays ...................... 701/34.2 |
| 2012/0271497 A1* | 10/2012 | Kleine-Besten et al. ...... 701/22 |

FOREIGN PATENT DOCUMENTS

| | | |
|---|---|---|
| DE | 10 2008 015 046 A1 | 9/2008 |
| DE | 10 2008 025 852 A1 | 12/2009 |
| DE | 10 2008 056 858 A1 | 5/2010 |
| DE | 10 2009 000 043 A1 | 7/2010 |
| EP | 1 270 303 A2 | 1/2003 |
| EP | 1 741 591 A1 | 1/2007 |
| JP | 2010-120552 A | 6/2010 |
| WO | WO 2010/058267 A1 | 5/2010 |

OTHER PUBLICATIONS

International Search Report dated Jul. 17, 2012 with English translation (eight (8) pages).

* cited by examiner

METHOD FOR OPERATING A HYBRID DRIVE

CROSS REFERENCE TO RELATED APPLICATIONS

This application is a continuation of PCT International Application No. PCT/EP2012/056731, filed Apr. 13, 2012, which claims priority under 35 U.S.C. §119 from German Patent Application No. DE 10 2011 075 226.9, filed May 4, 2011, the entire disclosures of which are expressly incorporated by reference herein.

BACKGROUND AND SUMMARY OF THE INVENTION

The present invention relates to a method for operating a hybrid drive of a vehicle and, in particular, to a method for operating a hybrid drive and that can be operated at least selectively in a first operating mode powered by only an internal combustion engine or in a second operating mode powered by only an electric motor.

DE 10 2006 033 930 A1 of Robert Bosch GmbH discloses a method for operating a hybrid drive of a vehicle. According to this method, a travel profile is determined for a route that is to be traveled; and then the internal combustion engine and the electric motor of the hybrid drive are controlled as a function of the operating parameters obtained from determining the travel profile. The "travel profile" can be the result of a number of different parameters, such as the length of the route, the altitude profile, location of intersections and/or traffic lights, road class, etc. Moreover, the parameters can be set manually by way of a navigation system. It is stated explicitly that the operating strategy is selected with respect to at least one of the following criteria: the fuel consumption, the emission of pollutants, the state of charge and/or the service life of the electrical storage device. It is not, however, apparent just how "predictive" the method described in DE 10 2006 033 930 A1 may be.

In many of the known operating strategies for hybrid vehicles the "control horizon" is very limited. In some operating strategies this control is even purely situational, i.e. based solely on the parameters of the momentary driving conditions or, more specifically, on the momentary system parameters.

The object of the present invention is to provide a method that is designed for operating a hybrid drive and with which it is possible to obtain an even better optimum use of the use of the drive energy (in the form of fuel and electrical energy) available in the vehicle.

This and other objects are achieved by a method for operating a hybrid drive, which can be operated at least selectively in a first operating mode powered by only an internal combustion engine or in a second operating mode powered by only an electric motor. Prior to the start of a trip, for which a route that leads from a start to a destination is determined, the entire route to be traveled is divided, according to a pre-defined logic, into a plurality of route sections. These route sections are used to select those route sections that are ever taken into consideration at all, based on certain route section criteria, for driving in the second operating mode. These selected route sections, in turn, are used to identify and to drive on the route in the second operating mode, in which travel on the route in the second operating mode yields in total an advantage in terms of maximum fuel economy as compared to driving on the route in the first operating mode or in any other operating mode.

The invention recognizes that a hybrid operating strategy that is designed for the current operating point of the vehicle provides only a suboptimum result. It has been recognized that the control horizon of the operating strategy has to be significantly extended in order to make optimum use of the energy, even in the case of longer trips, for which an entire tank of fuel or more fuel may be consumed.

A fundamental aspect of the invention consists of the description of the underlying object as a "reverse backpack problem." In practical terms, the issue is that the driver of a hybrid vehicle, in particular a so-called "plug-in hybrid," would like to charge the electrical energy storage device, which may be found in the vehicle, and would like to use the electrical energy stored in the vehicle for an "electric driving mode" in such a way that he saves the maximum amount of fuel that is used to drive the internal combustion engine of the vehicle. This problem raises the question: on which route sections of a given route should he travel, preferably using the electric drive of the vehicle. Thereafter, the operating strategy of the invention determines which operating mode should the vehicle be driven in, i.e., in a first operating mode powered by an internal combustion engine or in a second operating mode powered by only an electric motor and/or in a third operating mode (for example, combined internal combustion engine and electric motor powered operation).

According to the invention, prior to beginning a trip, the route between a starting point and a destination point is divided, according to a pre-defined logic, into a plurality of route sections. Then, from these route sections are (pre) selected those route sections that are ever taken into consideration at all, based on certain route section criteria, for driving in the second operating mode, i.e. for driving the route sections in an operation powered by only an electric motor. These selected route sections, in turn, are used to identify and then to drive in the second operating mode, a route in which travel on the route in the second operating mode yields in total an advantage in terms of maximum fuel economy as compared to driving on the route in the first operating mode or in any other operating mode.

As stated above, the control horizon covers an arbitrarily long route to be traveled. In other words, the entire route to be traveled is always analyzed independently of the length of the route to be traveled. That is, the entire route to be traveled is broken down into individual sections of the route. Then, the individual route sections are used to select those sections of the route that may be considered for driving in the second operating mode. These selected route sections are then used to identify those route sections, which would yield in total an advantage in terms of maximum fuel economy if they were driven in the second operating mode as compared to being driven in the first operating mode or in any other operating mode.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
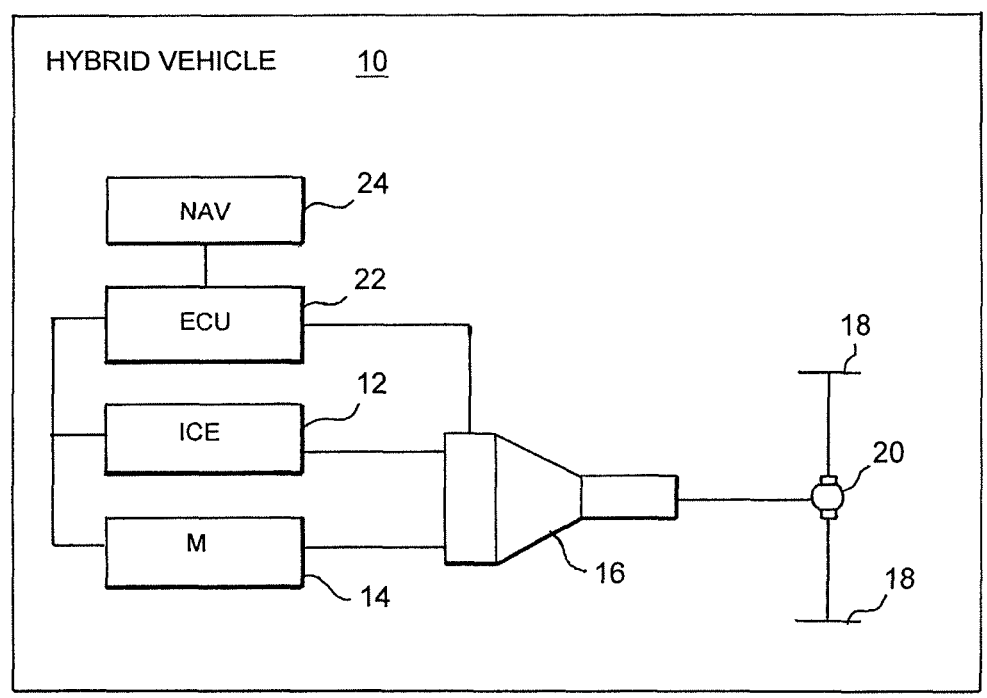
FIG. 1 is a highly simplified block diagram of a hybrid drive vehicle in which the method according to the present invention may be carried out.

FIG. 1 is a highly simplified diagram of a vehicle 10, which may have a hybrid drive including an internal combustion engine 12 and an electric motor 14. The hybrid drive can be operated at least selectively in a first operating mode powered by only the internal combustion engine 12 or any second operating mode powered by only the electric motor 14. FIG. 1 generically illustrates the internal combustion engine 12 and electric motor 14 being coupled with a transmission 16 that outputs a drive torque to driven wheels 18 of the vehicle 10 via a differential 20. An electronic control system 22 is shown generally coupled with the internal combustion engine 12, electric motor 14, and transmission 16. The electronic control system 22 is also shown coupled with a navigation system 24 of the vehicle 10. The electronic control system 22 may be a processor-based control system operating under programmable control in order to carry out the method for operating the hybrid drive of the vehicle.

Figure 2:
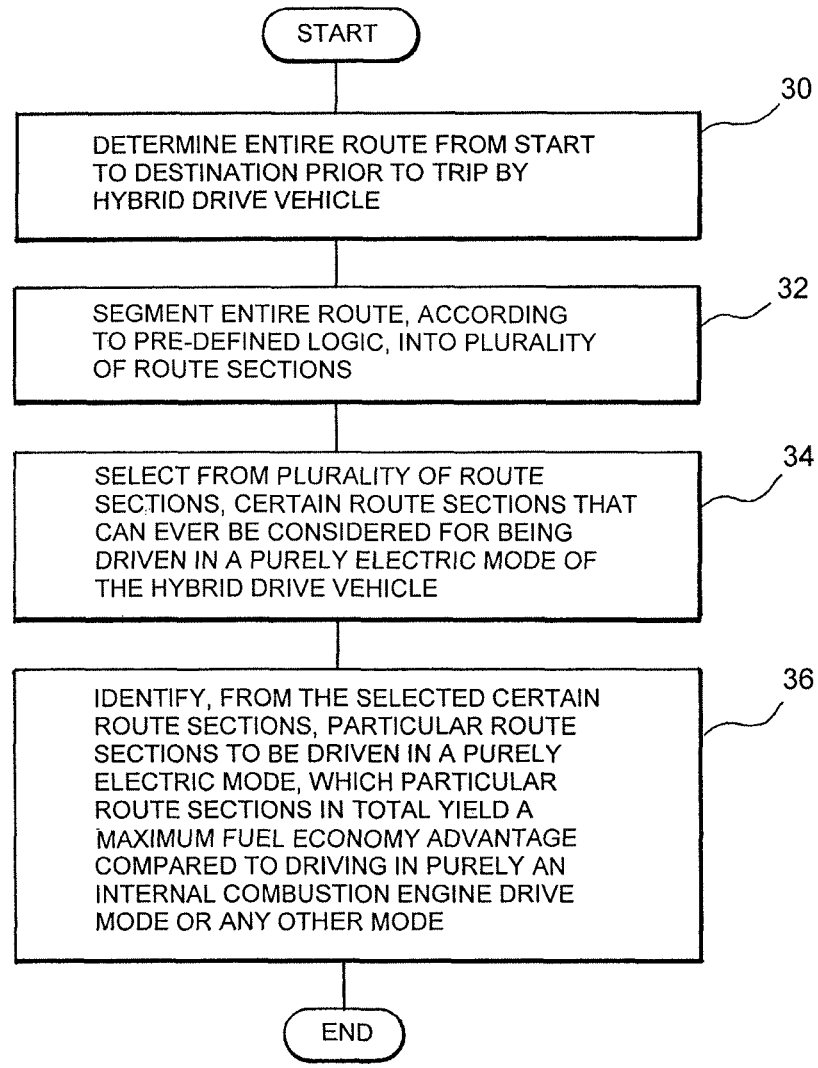
FIG. 2 is a simplified flow diagram of an algorithm according to an exemplary embodiment of the present invention. Detailed description of the drawings.

Referring to FIG. 2, a simplified flow diagram of an algorithm for carrying out the method of operating the hybrid drive is provided. After starting, prior to beginning a trip by the vehicle, an entire route from a start point to a destination point is determined (step 30). The entire route between the starting point and the destination point is then divided, according to a specified logic, into a plurality of route sections (step 32). Then, from the plurality of route sections, certain route sections are selected, which certain route sections are those that can ever be taken into consideration at all, based on certain route section criteria, for driving in the second operating mode, i.e., a purely electric drive mode of the hybrid drive (step 34). In turn, the selected certain route sections are used to identify and then to drive in the second operating mode a route in which travel on the route in the second operating mode yields a maximum fuel economy advantage compared to driving in purely an internal combustion engine driven mode or any other operating mode (step 36).

While the above operation may appear to be simple at first glance, it is associated with a high computational complexity, especially in the case of longer routes of several hundred kilometers. However, a significant advantage of the invention lies in the fact that the analysis of the route to be traveled may be performed even before the start of a trip.

The route to be traveled is segmented into individual sections of the route according to a pre-defined logic. The segmentation can be performed as a function of a number of different segmentation criteria. For example, it is possible to examine the route according to a pre-defined logic, in order to figure out the expected average speed along the route. Then, those sections of the route with a similar average speed can be combined into a longer section of the route. The analysis could also include information, such as the type of road (highway, country road, road in urban areas, speed limits, the upward or downward gradient of the road, etc.).

The estimated average speed can be used as an essential criterion for deciding whether such a route section that is formed in this way ever comes into consideration at all for travel in the second operating mode.

Then, each section of the route is assigned, figuratively speaking, a "price tag" specifying two data items, namely:
1. information as to how high the advantage in terms of fuel economy will most likely be if the section of the route in question is driven in the second operating mode as compared to being driven in the first operating mode or in any other operating mode; and
2. the expected electrical energy demand in order to drive on the relevant section of the route in the second operating mode.

Then, the next step is to solve, as stated above, an optimization problem that consists of picking out those route sections, for which the total advantage in terms of fuel economy is a maximum, as compared to when driven in the first operating mode or in any other operating mode. In this case the boundary condition has to be taken into account that the demand for electrical energy required to travel on the identified route section is at most as great as the electrical energy that is present in the energy storage device of the vehicle or, more specifically, that can be reliably retrieved.

In order to solve such an optimization problem, there are a number of well-known algorithms, such as the Bellman-Ford algorithm, the Greedy algorithm, etc.

A relatively simple heuristic for treating the optimization problem from an engineering point of view could consist of the fact that each of the i route sections is assigned a coefficient $k_i$, which is described by the ratio of the advantage in terms of the fuel economy obtained from driving on the route section in the second operating mode as compared to driving in the first operating mode or in any other operating mode ($\Delta v_i$) and the electrical energy required to drive on the route section in the second operating mode; that is, $$[k_i = (\Delta v_i / \Sigma).]$$

A simple approach (that is, an approach that is associated with low computational complexity) would be to travel by electrical energy on those sections of the route, for which the coefficients $k_i$ are greatest and for which the electrical energy stored in the vehicle is sufficient. It should also be mentioned explicitly that in this case it involves a heuristic approach: that is, not a solution that is mathematically optimal in every case.

In summary, the following advantages are achieved with the invention:
(1) it is a very long-term, predictive method that lends itself especially well to plug-in vehicles, and
(2) the possibility of a preliminary analysis of the route to be traveled avoids computationally intensive operations in control devices.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a hybrid drive in a vehicle, the hybrid drive being operable at least selectively in a first operating mode powered by only an internal combustion engine or in a second operating mode powered by only an electric motor, the method comprising the acts of:
   determining, prior to a start of a trip by the vehicle equipped with the hybrid drive, an entire route that extends from a start to a destination;
   segmenting the entire route into a plurality of route sections according to a pre-defined logic;
   from the plurality of route sections, selecting certain route sections that are to be considered for travel by the vehicle in the second operating mode based on specific route section criteria;
   from the selected certain route sections, identifying particular route sections in which travel through those route sections in the second operating mode in total produces a maximum fuel consumption advantage over traveling in the first operating mode;

joining together in a consecutive fashion individual certain route sections with similar average speed to that of an expected average speed of the entire route to form joint sections that in the aggregate are larger in length than a length of the individual certain route sections with the similar average speed;

generating an optimized route using at least the joint sections; and operating the hybrid drive in the vehicle in the second operating mode when traveling along the optimized route.

2. The method according to claim 1, wherein the entire route to be traveled is always analyzed independently of a length of the route to be traveled.

3. The method according to claim 1, wherein a destination for the route is input via a navigation system of the vehicle.

4. The method according to claim 1, wherein the identifying of the particular route sections is carried out by factoring into account a boundary condition where an estimated amount of electrical energy required in total to travel on the route in the second operating mode is less than an amount of energy stored in an electrical energy storage device in the vehicle that is retrievable.

5. The method according to claim 4, wherein the amount of energy stored is the retrievable electrical energy stored at the start of the trip.

6. The method according to claim 1, further comprising the act of:

determining, for each selected section of the route:
(i) an expected advantage in terms of fuel economy achievable from driving in the second operating mode as compared to driving in the first operating mode or in another operating mode, and
(ii) an expected electrical energy demand in order to drive on a relevant section of the route in the second operating mode.

7. The method according to claim 1, wherein an expected average speed is determined, according to a pre-defined logic, for each section of the route forming the route to be traveled.

8. The method according to claim 7, wherein the expected average speed is used as a criterion to decide whether a route section is ever taken into consideration at all for driving in the second operating mode.

9. A vehicle, comprising:
a hybrid drive having an electronic control system, wherein the hybrid drive is operable, at least selectively in a first operating mode powered by only an internal combustion engine or in a second operating mode powered by only an electric motor; and
wherein the electronic control system comprises a computer readable medium containing program code segments that:
determine, prior to a start of a trip by the vehicle equipped with the hybrid drive, an entire route that leads from a start to a destination;
segment the entire route into a plurality of route sections according to a pre-defined logic;
from the plurality of route sections, select certain route sections that are to be considered for travel in the second operating mode based on specific route section criteria; and
from the selected certain route sections, identify particular route sections in which travel through those route sections in the second operating mode in total produces a maximum fuel consumption advantage over traveling in the first operating mode;
join together in a consecutive fashion individual certain route sections with similar average speed to that of an expected average speed of the entire route to form joint sections that in the aggregate are larger in length than a length of the individual certain route sections with the similar average speed; and
generate an optimized route using at least the joint sections, wherein
the hybrid drive is operated in the second operating mode when traveling along the optimized route.

10. A method for operating a hybrid drive in a vehicle, the hybrid drive being operable at least selectively in a first operating mode powered by only an internal combustion engine and in a second operating mode powered by only an electric motor, the method comprising the acts of:
determining, by the vehicle equipped with the hybrid drive, an entire route that extends from a start to a destination;
segmenting the entire route into a plurality of route sections according to a pre-defined logic;
from the plurality of route sections, selecting certain route sections that are to be considered for travel by the vehicle in the second operating mode based on specific route selection criteria;
assigning to each selected certain route section a price tag value based on: (i) an expected advantage in terms of fuel economy achievable from driving in the second operating mode, and (ii) an expected electrical energy demand corresponding to an amount of electrical energy that is necessary to drive the vehicle in the second operating mode;
identifying one combination of all of the price tag values that produces a maximum fuel consumption advantage over any other combination of price tag values;
generating an optimized travel route for the vehicle that extends from the start to the destination, the optimized travel route including particular route sections corresponding to the identified one combination; and
operating the hybrid drive in the vehicle in the second operating mode when traveling along the optimized travel route, wherein
individual certain route sections with a similar average speed to that of an expected average speed of the entire route are consecutively joined together to form sections of the optimized route that in the aggregate are larger in length than a length of the individual certain route sections with the similar average speed.

11. The method according to claim 10, wherein the entire route to be traveled is always analyzed independently of a length thereof.

12. The method according to claim 10, wherein the destination is input via a navigation system of the vehicle.

13. The method according to claim 10, wherein the identifying of the one combination of all of the price tag values is carried out by factoring into account a boundary condition where an estimated amount of electrical energy required in total to travel on the optimized route in the second operating mode is less than an amount of energy stored in an electrical energy storage device in the vehicle that is retrievable.

14. The method according to claim 13, wherein the amount of energy stored is the retrievable electrical energy stored at the start of the trip.

15. The method according to claim 10, wherein an expected average speed is determined, according to the pre-defined logic, for each section of the route forming the optimized route.

16. The method according to claim 15, wherein the expected average speed is used as a criterion to decide whether a route section is ever taken into consideration at all for driving in the second operating mode.

17. The method according to claim 1, further comprising:
assigning to each of the segmented plurality of route sections a given coefficient that corresponds to a ratio of an advantage in terms of the fuel economy obtained from driving on the route section in the second operating mode as compared to driving in the first operating mode or in any other operating mode to and electrical energy required to drive on the route section in the second operating mode; and
generating the optimized route using the route sections with the highest coefficients.

18. The vehicle according to claim 9, wherein the program code segments also:
assign to each of the segmented plurality of route sections a given coefficient that corresponds to a ratio of an advantage in terms of the fuel economy obtained from driving on the route section in the second operating mode as compared to driving in the first operating mode or in any other operating mode to and electrical energy required to drive on the route section in the second operating mode; and
generate the optimized route using the route sections with the highest coefficients.

19. The method according to claim 10, further comprising:
assigning to each of the segmented plurality of route sections a given coefficient that corresponds to a ratio of an advantage in terms of the fuel economy obtained from driving on the route section in the second operating mode as compared to driving in the first operating mode or in any other operating mode to and electrical energy required to drive on the route section in the second operating mode; and
generating the optimized route using the route sections with the highest coefficients.

* * * * *